US008477698B2

United States Patent
Lee et al.

(10) Patent No.: US 8,477,698 B2
(45) Date of Patent: Jul. 2, 2013

(54) METHOD FOR SELECTING RACH FREAMBLE SEQUENCE FOR HIGH-SPEED MODE AND LOW-SPEED MODE

(75) Inventors: Hyun Woo Lee, Anyang-si (KR); Seung Hee Han, Anyang-si (KR); Min Seok Noh, Anyang-si (KR); Jin Sam Kwak, Anyang-si (KR); Yeong Hyeon Kwon, Anyang-si (KR); Dragan Vujcic, Orsay (FR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 12/451,062

(22) PCT Filed: May 1, 2008

(86) PCT No.: PCT/KR2008/002481
§ 371 (c)(1),
(2), (4) Date: Oct. 23, 2009

(87) PCT Pub. No.: WO2008/133486
PCT Pub. Date: Nov. 6, 2008

(65) Prior Publication Data
US 2010/0118799 A1    May 13, 2010

Related U.S. Application Data

(60) Provisional application No. 60/915,415, filed on May 1, 2007.

(30) Foreign Application Priority Data

Nov. 27, 2007    (KR) .................. 10-2007-0121417

(51) Int. Cl.
*H04W 4/00*    (2009.01)
*H04W 72/00*    (2009.01)

(52) U.S. Cl.
USPC ............................................ 370/329; 455/450

(58) Field of Classification Search
USPC ................ 370/310–350, 431, 436–437, 468, 370/477; 455/434, 450–454, 464; 375/132–147
See application file for complete search history.

(56) References Cited

U.S. PATENT DOCUMENTS

2008/0101306 A1* 5/2008 Bertrand et al. ............... 370/336
2008/0165903 A1* 7/2008 Hooli et al. ................... 375/343
(Continued)

FOREIGN PATENT DOCUMENTS
CN    1533055    9/2004

OTHER PUBLICATIONS

Samsung: "Using Restricted Preamble Set for RACH in High Mobility Environments", 3GPP TSG RAN WG1 Meeting #48bis, R1-071560, Mar. 2007.

(Continued)

*Primary Examiner* — Habte Mered
(74) *Attorney, Agent, or Firm* — McKenna Long & Aldridge LLP (57) ABSTRACT

A method for selecting a RACH preamble sequence for a high-speed mode and a low-speed mode is disclosed. In the case of acquiring sequence-type information to be used by a specific UE contained in a high-mobility region, a signaling reanalysis method under a general circular shift condition is disclosed, and a method for acquiring sequence-type information via the signaling using the sequence set configured by a restricted circular shift condition is also disclosed. Finally, a method for constructing a sequence set is disclosed.

12 Claims, 3 Drawing Sheets

U.S. PATENT DOCUMENTS

2008/0225785 A1* 9/2008 Wang et al. .................. 370/329
2009/0109919 A1* 4/2009 Bertrand et al. ............. 370/330

OTHER PUBLICATIONS

Huawei: "Specification of restricted set of cyclic shifts of root Zadoff-Chu sequences", TSG RAN WG1 meeting #48bis, R1-071408, Mar. 2007.

Popović et al., "Random Access Preambles for Evolved UTRA Cellular System", IEEE Ninth International Symposium on Spread Spectrum Techniques and Applications, 2006, pp. 488-492.

LG Electronics Inc: "Design for restricted set of cyclic shifts" R1-071697, 3rd Generation Partnership Project (3GPP), TSG RAN WG1 #48bis, Mar. 2007, XP050105620.

Panasonic: "RACH sequence indication method on BCH"; R1-071519, 3rd Generation Partnership Project (3GPP), TSG RAN WG1 Meeting #48bis, Mar. 2007, XP050105452.

CATT: "Consideration of preamble sequence with frequency offset for E-UTRA TDD" R1-071874, 3rd Generation Partnership Project (3GPP), TSG RAN WG1 LTE TDD Ad Hoc, Apr. 2007, XP050111778.

LG Electronics: "Ways to Mitigate Frequency Offset with CAZAC Cyclic Shift", 3GPP TSG RAN WG1 Meeting #47bis, Sorrento, Italy, Jan. 15-19, 2007, R1-070227.

\* cited by examiner

METHOD FOR SELECTING RACH FREAMBLE SEQUENCE FOR HIGH-SPEED MODE AND LOW-SPEED MODE

This application claims priority to International Application No. PCT/KR2008/002481 filed on May 1, 2008, which claims priority to Provisional Application No. 60/915,415 filed on May 1, 2007 and Korean Patent Application No. 10-2007-0121417 filed on Nov. 27, 2007, all of which are incorporated by reference for all purposes as if fully set forth herein.

TECHNICAL FIELD

The present invention relates to a random access for use in a wireless communication system, and more particularly to a method for allowing a high-speed user equipment (UE) of the wireless communication system to acquire random access sequence type information, a method for selecting a RACH preamble sequence for a high-speed mode and a low-speed mode, and a sequence-set construction method for the above methods.

BACKGROUND ART

A random access channel (RACH) is a channel for acquiring initial uplink synchronization. If a terminal (i.e., UE) is firstly powered on, or the terminal (UE) is switched to an active status after it has been in an idle mode for a long period of time, uplink synchronization should be re-established. The RACH is generally adapted to re-establish the uplink synchronization, and need not establish time synchronization or frequency synchronization.

The RACH basically supports a plurality of users (hereinafter referred to as a multi-user). Each user equipment (UE) transmits a specific preamble sequence when accessing the RACH. If a base station (hereinafter referred to as a Node-B) recognizes the preamble sequence and transmits the recognized preamble sequence, the user equipment (UE) updates its own time synchronization information using the aforementioned preamble sequence information. In this case, if the Node-B transmits frequency synchronization information along with the time synchronization information, this frequency synchronization information can also be used to correct the user equipment (UE).

A Constant Amplitude Zero Auto-Correlation (CAZAC) sequence is a representative one of various sequences which have been intensively discussed in the 3GPP LTE.

Channels generally extract a variety of identifiers (IDs) or information using the CAZAC sequence, for example, synchronization channels (e.g., a primary-SCH, a secondary-SCH, and a BCH) for downlink synchronization, other synchronization channels (e.g., a RACH) for uplink synchronization, and pilot channels (e.g., a data pilot, and a channel quality pilot). Also, the above-mentioned CAZAC sequence has been used to perform the scrambling.

The CAZAC sequence is generally classified into the GCL CAZAC sequence and the Zadoff-Chu CAZAC sequence. The GCL CAZAC sequence and the Zadoff-Chu CAZAC sequence have complex conjugates with each other. The GCL CAZAC sequence may be acquired by a complex conjugate of the Zadoff-Chu CAZAC sequence. The Zadoff-Chu CAZAC sequence can be represented by the following equations 1 and 2:

$$c(k; N, M) = \exp\left(\frac{j\pi Mk(k+1)}{N}\right) \text{(for odd } N\text{)} \quad \text{(Equation 1)}$$

$$c(k; N, M) = \exp\left(\frac{j\pi Mk^2}{N}\right) \text{(for even } N\text{)} \quad \text{(Equation 2)}$$

In Equations 1 and 2, "k" is indicative of a sequence index, "N" is indicative of the length of the CAZAC sequence to be generated, and "M" is indicative of a sequence ID.

If the Zadoff-Chu CAZAC sequence of Equations 1 and 2 and the GCL CAZAC sequence which is complex-conjugated with the Zadoff-Chu CAZAC sequence are denoted by c(k; N,M), the following equations 3, 4, and 5 are acquired.

$$|c(k;N;M)|=1 \text{ (for all } k,N,M\text{)} \quad \text{[Equation 3]}$$

$$R_{M;N}(d) = \begin{cases} 1, & \text{(for } d = 0\text{)} \\ 0, & \text{(for } d \neq 0\text{)} \end{cases} \quad \text{(Equation 4)}$$

$$R_{M_1,M_2;N}(d)=p \text{ (for all } M_1, M_2 \text{ and } N\text{)} \quad \text{[Equation 5]}$$

In Equation 3, the size or amplitude of the CAZAC sequence is always indicative of "1". In Equation 4, the auto-correlation function of the CAZAC sequence is denoted by a delta function, and the auto-correlation is based on a circular correlation. In Equation 5, a cross-correlation is always indicative of a constant or invariable number.

The CAZAC sequence is a representative sequence which has been intensively discussed in the 3GPP LTE. The CAZAC sequence can be generally used by the following methods. A first method changes a root index of the sequence to another, and then uses the resultant sequence. A second method performs the circular shift (CS) on the sequence corresponding to a single root index, and then uses the resultant sequences.

There are two methods for applying the circular shift (CS) to the CAZAC sequence, i.e., a first method for performing the circular shift (CS) on the sequence, and a second method for multiplying an exponential function of another area by a time-area sequence or a frequency-area sequence, and then performing the circular shift (CS) on the multiplied result.

The circular shift (CS) method of the sequence can be represented by the following equation 6:

$$c(k;d,M,N)=c(\mod(k-d,N);M,N) \quad \text{[Equation 6]}$$

In Equation 6, "d" is indicative of an amount of the circular shift (CS), and "mod" is indicative of a modulo-operator.

The method for multiplying the sequence by an exponential function, and applying the circular shift (CS) to the resultant sequence can be represented by the following equation 7:

$$c(k; d, M, N) = f(\mod(k-d, N); M, N) = \exp\left(\frac{j2\pi dk}{N}\right) FFT(c(k; d, M, N)) \quad \text{(Equation 7)}$$

The CAZAC sequence has a little cross-correlation value under different root indexes, but this cross-correlation does not affect the design of the sequence usage.

However, if the circular shift (CS) is applied to the CAZAC sequences, a cross-correlation value among the resultant CAZAC sequences is zero, so that these CAZAC sequences are used when the high rejection ratio is needed. Specifically, the above CS-processed CAZAC sequences share the same time-frequency resources within the same cell, so that they are used to discriminate among different signals and different UEs during the transmission of data/control signals.

For the convenience of description and better understanding of the present invention, the above-mentioned Zadoff-Chu CAZAC sequence is called a ZC sequence. If a specific sequence of the ZC sequence is discriminated by only the root index irrespective of the circular shift (CS), this specific sequence is called a root index sequence or a root sequence. If the circular shift (CS) is applied to a specific sequence of the specific root index sequence such that the specific sequence is discriminated, this specific sequence is called a circular shift (CS) sequence or a zero correlation zone (ZCZ) sequence. In this case, the ZCZ is indicative of a specific interval which can discriminate among sequences to which different circular shifts (CSs) are applied although the circular shift (CS) is applied to a specific root index sequence.

In the meantime, a mobile communication system may support a variety of circular shift sizes of a specific sequence. For example, the above-mentioned random access channel (RACH) may have different circular shift sizes for the ZC-ZCZ sequences according to the sizes of individual cells.

For example, for the convenience of description, it is assumed that the length of the ZC sequence is N samples, and each cell must provide M number of random access signals (hereinafter referred to as M number of random access opportunities) capable of being simultaneously supported. Therefore, a cell of using only a single small-sized root index must provide M/1 number of circular shift (CS) sequences (i.e. M/1 CS sequences) for each root index sequence. Also, the cell of using the K number of root indexes must provide [M/K] number of circular shift (CS) sequences for each root index. In this way, there is a need to provide a variety of circular shift (CS) sequences according to the number of root indexes used for either each cell or each cell size.

In addition, in some cases, there may be needed to use different sequences according to individual cells or individual areas. Therefore, in order to allow a cell of a restricted circular shift (CS) cell or a specific-region UE to recognize sequence-type information for a random access, the conventional RACH requires the additional signaling.

DISCLOSURE

Technical Problem

Accordingly, the present invention is directed to a method for selecting a RACH preamble sequence for a high-speed mode and a low-speed mode that substantially obviates one or more problems due to limitations and disadvantages of the related art.

An object of the present invention is to provide a method for allowing a user equipment (UE) of a restricted CS area to acquire available sequence type information without using the additional signaling overhead, and a method for selecting the RACH preamble sequence using the same method.

Another object of the present invention is to provide a RACH preamble sequence selection method which uses the same sequence-set signaling information in both a restricted circular shift (CS) area and a general CS area, is re-reanalyzed by a new scheme, and acquires available sequence type information without using additional signaling information, such that it selects a RACH preamble sequence.

Another object of the present invention is to provide a method for constructing a new sequence set in a restricted CS area, effectively constructing the sequence set to provide a maximum of random access opportunities and simultaneously while satisfying a restricted CS condition contained in a corresponding sequence set, and acquiring available sequence type information using the constructed sequence set.

Technical Solution

To achieve these objects and other advantages and in accordance with the purpose of the invention, as embodied and broadly described herein, a method for allowing a user equipment (UE) to select a random access channel (RACH) preamble sequence comprising: acquiring at least one parameter information for a random access; and selecting the RACH preamble sequence, which is to be used by the user equipment (UE) for the random access, using the acquired parameter information, in which the parameter information is analyzed as different values in a high-mobility mode equal to or higher than a reference value and a low-mobility mode less than the reference value.

Preferably, the parameter information includes information associated with a circular shift value.

Preferably, the parameter information includes a length of 4 bits.

Preferably, the high-mobility mode equal to or higher than the reference value is called a restricted mode, and the low-mobility mode less than the reference value is called an unrestricted mode.

In another aspect of the present invention, there is provided a method for allowing a user equipment (UE) to generate a random access channel (RACH) preamble sequence comprising: a) acquiring at least one parameter information for a random access; and b) selecting at least one remaining parameter corresponding to the acquired parameter information from among pre-defined sequence constituent parameters, and generating the RACH preamble sequence, in which the pre-defined sequence constituent parameters are defined as a first-type set for a high-mobility mode equal to or higher than a reference value, and a second-type set for a low-mobility mode less than the reference value.

Preferably, the parameter information may include sequence-set type information. The sequence-set type information may indicate a sequence constituent parameter from among the first-type set and the second-type set, in which the sequence constituent parameter can be used by the user equipment (UE).

Preferably, the parameter information includes information associated with a circular shift value. This information associated with the circular shift value may be analyzed in different ways according to the first- and second-type sets.

Preferably, the user equipment (UE) at the step b) of generating the RACH preamble differently selects the at least one remaining parameter corresponding to the acquired parameter information from among the pre-defined sequence constituent parameters according to an available set type from among the first- and second-type sets.

Preferably, the first-type set is called a restricted mode, and the second-type set is called an unrestricted mode.

It is to be understood that both the foregoing general description and the following detailed description of the present invention are exemplary and explanatory and are intended to provide further explanation of the invention as claimed.

Advantageous Effects

According to the present invention, the user equipment (UE) of a restricted CS area can easily acquire available sequence type information without using the additional signaling overhead.

The RACH preamble sequence selection method according to the present invention uses the same sequence-set signaling information in a restricted circular shift (CS) area and a general CS area, is re-reanalyzed by a new scheme, and acquires available sequence type information without using additional signaling information, such that it can select a RACH preamble sequence.

The present invention constructs a new sequence set in a restricted CS area, provides a method for enabling the UE to easily acquire available sequence type information, and provides a method for effectively constructing a sequence set in a restricted CS area.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

In some cases, there may be used different sequences according to individual cells or regions. Specifically, the present invention provides a method for allowing a high-mobility cell to use a restricted cyclic shift (CS) set in consideration of a frequency offset in a 3GPP LTE system. In order to allow a restricted cyclic shift (CS) cell or a specific-region UE to acquire sequence type information for a random access, there is a disadvantage in that an additional signaling process is generally required.

Therefore, the present invention provides a method for allowing a restricted CS cell or a specific-region UE to effectively acquire available sequence type information without using additional signaling overhead. For this purpose, if a general unrestricted cyclic shift (CS) set is used, i.e., if there is no limitation in the cyclic shift (CS), a sequence set available for a specific UE will hereinafter be described. Therefore, a method for allowing the UE to acquire sequence type information without using additional signaling overhead under a restricted cyclic shift (CS) condition will hereinafter be described.

There is proposed a sequence set in which a variety of CS sequences are defined in consideration of various random access conditions of a wireless communication system. According to this sequence set, the number of root index sequences which can use a sequence set in a specific cell is configured, the number of CS sequences capable of being applied to each root index sequence is configured, and the sequence set configured in the form of a CS combination is configured. The number of combinations contained in the above-mentioned sequence set is limited to a specific value "4" as an example, as shown in the following Table 1.

TABLE 1

| Sequence length (µs) | # of cyclic shifts per ZC seq. | # of ZC sequences | Cyclic shift (samples) | Max. cell radius from cyclic shift (km) |
|---|---|---|---|---|
| 800 | 64 | 1 | 13 | 0.78 |
| | 32 | 2 | 26 | 2.59 |
| | 16 | 4 | 53 | 6.34 |
| | 8 | 8 | 107 | 13.85 |

In Table 1, it is assumed that the length of the ZC sequence is 863 samples, and each cell can support 64 random access opportunities according to the 3GPP LTE working assumption.

As described above, if the sequence set equipped with a less number of combinations is used, it is difficult for the above-mentioned sequence set to be elastically applied to a supportable cell-radius.

In association with the above-mentioned description, a representative example has been described in Korean Patent Application No. 2007-0117363 (hereinafter referred to as the "117363 patent) field by the same applicant as the present invention, entitled "SEQUENCE SET CONSTRUCTION METHOD AND RANDOM ACCESS METHOD USING THE SAME", which is hereby incorporated by reference. The above-mentioned Korean Patent Application No. 2007-0117363 provides a method for constructing a sequence set according to a rational reference in consideration of a supportable cell-radius and a signaling overhead.

According to the "117363 patent, the sequence set determines the number of random access signals (i.e., M number of random access opportunities for satisfying M number of random access opportunities) which must be simultaneously supported by a cell according to the number of all the available root indexes, to be a candidate combination. If the number of cyclic shifts available for each root index in a specific combination overlaps with that of another combination, a combination having the smallest number of cyclic shifts may be selected according to a first method or another combination for selecting a maximum of supportable cell-radius may be selected according to a second method. The sequence set configured by the first and second methods can be represented by the following equation 2.

TABLE 2

| Configuration No. | No. of ZC sequence per cell (no cyclic shift restrictions) | No. of Cyclic shift per ZC sequence (no cyclic shift restrictions) | Cyclic Shift [samples] | Max. cell radius [km] | |
|---|---|---|---|---|---|
| | | | | No Guard sample | 2 guard samples |
| 1 | 1 | 64 | 13 | 1.1 | 0.8 |
| 2 | 2 | 32 | 26 | 2.9 | 2.6 |
| 3 | 3 | 22 | 38 | 4.5 | 4.2 |
| 4 | 4 | 16 | 52 | 6.5 | 6.2 |
| 5 | 5 | 13 | 64 | 8.1 | 7.8 |
| 6 | 6 | 11 | 76 | 9.8 | 9.5 |
| 7 | 7 | 10 | 83 | 10.8 | 10.5 |
| 8 | 8 | 8 | 104 | 13.7 | 13.4 |
| 9 | 10 | 7 | 119 | 15.8 | 15.5 |
| 10 | 11 | 6 | 139 | 18.6 | 18.3 |
| 11 | 13 | 5 | 167 | 22.4 | 22.1 |
| 12 | 16 | 4 | 209 | 28.3 | 28.0 |
| 13 | 22 | 3 | 279 | 38.0 | 37.7 |
| 14 | 32 | 2 | 419 | 57.4 | 57.1 |
| 15 | 64 | 1 | 839 | 115.8 | 115.5 |
| 16 | reserved | reserved | reserved | reserved | reserved |

If there is no restriction in the cyclic shift (CS), the user equipment (UE) receives the signaling information indicating the available combination (or available configuration) shown in Table 2. Therefore, the user equipment (UE) can acquire available sequence type information on the basis of the number of root indexes occupied by a corresponding combination, the number of cyclic shifts for each root index, and the cyclic shift value for each root index. In more detail, the base station (BS) indicates sequence type information capable of being used by each UE via a signaling action of 4-bit. Therefore, a specific UE receives this signaling information, such that it can recognize the number of root indexes which can be used by the specific UE itself, the number of cyclic shifts for each root index, and the cyclic shift value (i.e., a sample number) for each root index.

Also, the user equipment (UE) receives only at least one information from among three information (i.e., the number of root indexes, the number of cyclic shifts, the cyclic shift value) owned by the above-mentioned combination as the signaling information, and may calculate the remaining information on the basis of the received information.

For example, if the user equipment (UE) recognizes only the number of available root indexes according to corresponding signaling information, it can acquire the number of cyclic shifts which can be applied to each root index using M number of random access opportunities which must be supported by each cell. For example, if a specific UE determines the number of available root indexes to be 10 upon receiving the signaling information from the base station (BS), it must use $\lceil M/K \rceil$ number of cyclic shifts in order to apply 64 random access opportunities to each cell according to the 3GPP LTE system assumption. As a result, the UE can recognize that the number of cyclic shifts applicable to each root index is 7 ($=\lceil 64/10 \rceil$). In addition, if the number of cyclic shifts is acquired by the above-mentioned process, the cyclic shift value ($N_{cs}$) can be acquired by the following equation 8 on the basis of the length of a corresponding sequence (N).

$$N_{cs} = \lfloor N/\lceil M/K \rceil \rfloor \qquad \text{[Equation 8]}$$

In Equation 8, if the sequence length N is 838 samples, the cyclic shift value (Ncs) can be denoted by 119 samples ($=\lfloor 839/\lceil 64/19 \rceil \rfloor$). Therefore, the number of root indexes, the number of cyclic shifts for each root index, and the cyclic shift value for each root index may be commonly called parameter information for a random access. As described above, from the viewpoint of a method for extracting the cyclic shift value, the above-mentioned values may also be commonly called specific information associated with the cyclic shift value.

However, in the case of using the restricted cyclic shift, the number of available cyclic shifts for each root index may be changed to another number as necessary. In some cases, there may be a forbidden index for minimizing the influence of a frequency offset.

Next, the above-mentioned restricted cyclic shift condition will hereinafter be described in detail. Although the following description will basically describe an exemplary case in which the ZC sequence is defined and used in a frequency domain, it should be noted that the ZC sequence can also be defined and used in a time domain in the same manner as in the frequency domain.

If the random access sequence is a CAZAC sequence, different frequency offset characteristics may be applied to not only sequences (i.e., root-index sequences) of root indexes of each sequence but also other sequences (i.e., cyclic shift sequences) to which the cyclic shift is applied to individual root indexes.

Figure 1:
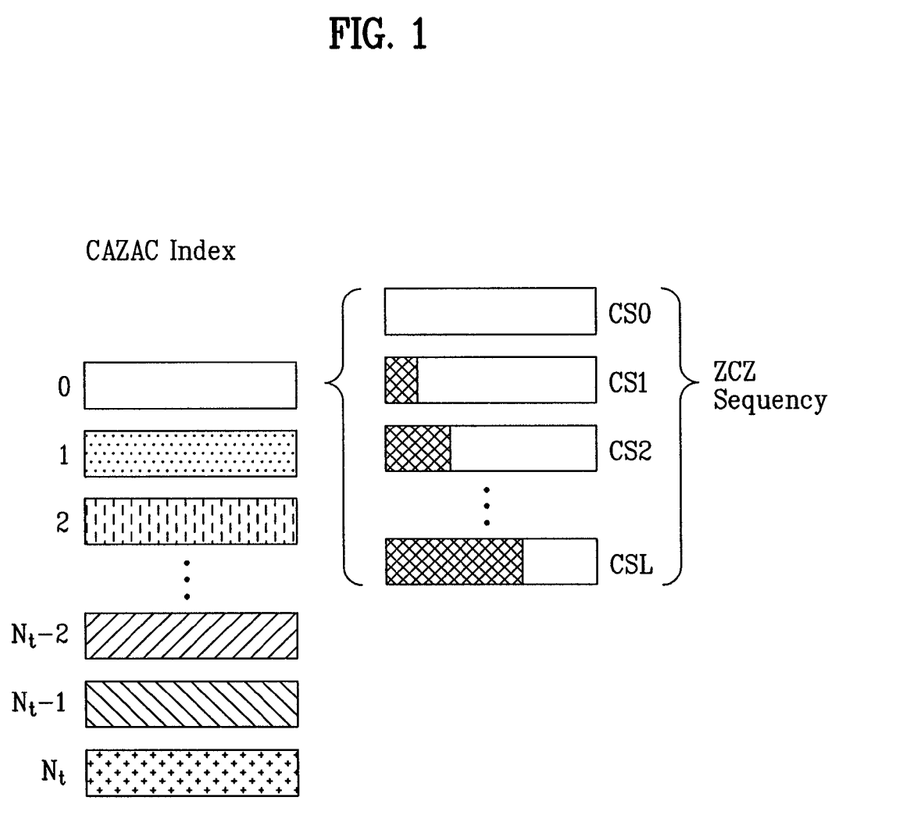
FIG. 1 is a conceptual diagram illustrating a CAZAC sequence according to the present invention.

FIG. 1 is a conceptual diagram illustrating a CAZAC sequence according to the present invention.

Referring to FIG. 1, the CAZAC sequence may include root sequences of individual root indexes and a zero correlation zone (ZCZ) sequence by which different cyclic shifts are applied to the individual root sequences. In more detail, FIG. 1 shows the root index sequences of Nt number of root indexes and a ZCZ sequence set by which L number of different cyclic shifts are applied to the individual root index sequences.

In the meantime, if the CAZAC sequence is used on the condition that the frequency offset exists, it may be difficult for the ZCZ sequences to be distinguished from each other by the frequency offset. Therefore, a specific system may not use the ZCZ sequence as a sequence to be used for a specific cell (i.e., a cell having a mobility equal to or higher than a predetermined level) having a frequency offset equal to or higher than a predetermined level. However, if the ZCZ sequence is not used in the above-mentioned cell having the mobility equal to or higher than the predetermined level, Nt number of indexes can be used according to the CAZAC root index as shown in FIG. 1, such that the number of available sequences is greatly reduced. In this way, if a sequence re-use coefficient becomes lower, the present invention must allocate sequences according to the cell planning. However, this allocation based on the cell planning may unexpectedly increase the complexity in the process for allocating the sequences to individual cells, so that another solution may be additionally required on the condition that the number of available sequences encounters the problem.

In the meantime, the above-mentioned problem having difficulty in discriminating among ZCZ sequences due to the frequency offset becomes intensified on the condition that the CAZAC index is very high or is not very low.

In more detail, provided that "k" is indicative of a frequency-axis index, "N" is indicative of the CAZAC-sequence length, "M" is indicative of a CAZAC sequence, and a transmission (Tx) signal is indicative of "c(k,N,M)", a reception signal R(k,N,M) can be represented by the following equation 9:

$$R(k, N, M) = c(K, N, M) \cdot \exp\left(-\frac{2\pi M \cdot d}{N} \cdot k\right) \quad \text{(Equation 9)}$$

where "d" is indicative of the amount of a frequency-axis delay caused by the frequency offset.

As can be seen from Equation 9, if the CAZAC index "M" has a very low value, or if the CAZAC index "M" has the highest value from among a total of Nt sequence indexes, the influence of the exponential function caused by the frequency offset is gradually reduced, so that the influence of the frequency offset in the reception signal R(k,N,M) is gradually reduced.

Therefore, if a specific system is contained in the cell having the frequency offset of more than the predetermined level, it uses the ZCZ sequence and may allocate only the root sequence. In the case of using the ZCZ CAZAC sequence due to the insufficient number of root sequences, the present invention may allow the CAZAC sequence to employ a specific sequence which is in an initial predetermined range or the last predetermined range from among total indexes. In this case, it should be noted that the term "predetermined range" can be established in different ways according to system detection performances.

In more detail, if a specific system has Nt number of total root indexes as shown in FIG. 1, the sequence to be used in the cell of the high frequency offset may be set to root indexes 0, 1, 2, Nt−2, Nt−1, and Nt.

In brief, if either a UE or a high-mobility UE is located at a cell or region having the above predetermined-level frequency offset, the use of a specific root index may be restricted.

As described above, according to the above-mentioned specific system, the number of cyclic shifts applicable to each root index may be restricted.

In more detail, if the frequency offset exists, the frequency response of the response signal can be represented by the following equation 10:

$$r(k, f_{off}) = \sum_{n=0}^{N-1} p(kw_0 - nw_0 + f_{off})c(n) \quad \text{(Equation 10)}$$

In Equation 10, "r (k, $f_{off}$)" is indicative of a reception frequency response at a k-th sub-carrier position at a frequency offset $f_{off}$, "c(n)" is indicative of a CAZAC sequence mapped to a sub-carrier, "p(f)" is a pulse-shaping function, and $\omega_0$ is a sub-carrier interval.

If the value of $f_{off}$ is equal to zero (i.e., $f_{off}$=0), the resultant value of Equation 10 is generally set to only "c(k)". Otherwise, if the value of $f_{off}$ is not equal to zero (i.e., $f_{off}\neq 0$), a signal of a neighboring sub-carrier can be received in the reception frequency response "r (k, $f_{off}$)", resulting in the occurrence of a performance deterioration.

In the meantime, Equation 10 shows that a signal value is transferred from all the neighboring sub-carriers due to the frequency offset. However, indeed, a specific component greatly affecting the channel response of the Rx signal may be set to a part located at both sides of a corresponding sub-carrier, wherein the part receives a signal of the neighboring sub-carrier.

Therefore, in the case of considering only the first order case, Equation 10 may be represented by three terms, as shown in the following equation 11.

$$r(k;f_{off})=p(-f_0-f_{off})c(k-1)+p(-f_{off})c(k)+p(f-f_{off})c(k+1) \quad \text{[Equation 11]}$$

In the meantime, the reception end applies a conjugate complex number c(n) to the Rx signal, so that the applying result can be represented by the following equation 12:

$$r(k, f_{off})c^*(k) = \alpha_0 + \alpha_{-1}\exp\left(-\frac{j2\pi Mk}{N}\right) + \alpha_1\exp\left(\frac{j2\pi M(k+1)}{N}\right) \quad \text{(Equation 12)}$$

The pulse-shaping function of Equation 11 can be easily denoted by a raised cosine- or sinc-function.

For the convenience of description, the pulse-shaping function is represented by constants $\alpha_0$, $\alpha_{-1}$, and $\alpha_1$.

With reference to Equation 12, the channel response of the Rx signal occurs at three points, i.e., "t" indicative of a target position in the time domain, "t−M" indicative of a position shifted to the left side, and "t+M" indicative of a position shifted to the right side. It can be recognized that the channel response generated at the M-shifted position on the basis of the right/left sides corresponds to the alias of the Rx signal.

For reference, in the case of generating/using the ZC sequence in the time domain, the distance between a first peak position acquired when there is no influence of the Doppler frequency and a second peak position acquired by the alias caused by the Doppler frequency is changed to $c_{off,u}$= (m·$N_{ZC}$−1)/M instead of "M". In this case, "m" is indicative of the smallest integer capable of allowing the $c_{off,u}$ value to be an integer, "M" is indicative of a root index, and "Nzc" is indicative of the length of the ZC sequence. Therefore, the influence of aliasing can be commonly applied to the first case in which the ZC sequence is generated/used in the time domain and the second case in which the ZC sequence is generated/used in the frequency domain.

Figure 2:
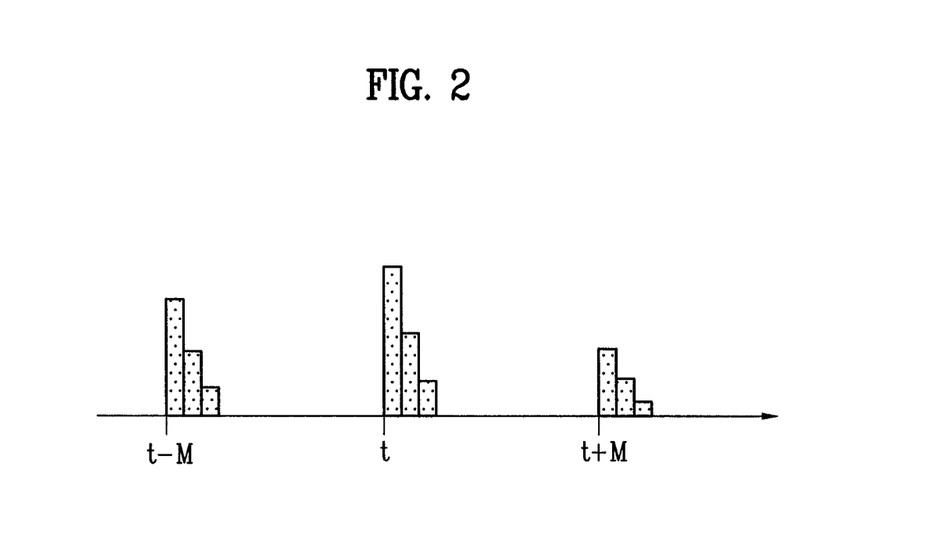
FIG. 2 is a conceptual diagram illustrating aliases which occur in a time-domain channel response of a reception (Rx) sequence due to the frequency offset according to the present invention.

In the meantime, the above-mentioned phenomenon in which the alias occurs in the time-domain channel response of the reception sequence due to the frequency offset is shown in FIG. 2.

FIG. 2 is a conceptual diagram illustrating aliases which occur in a time-domain channel response of a reception (Rx) sequence due to the frequency offset according to the present invention;

If the cyclic shift is applied to a sequence used in a specific cell having a frequency offset of more than a predetermined level, a single alias occurs at the target position in the Rx-channel response of the corresponding sequence, and two additional aliases may occur in the Rx-channel response of the corresponding sequence, as shown in FIG. 2.

Therefore, if the CS-applying interval is established irrespective of the target position and the alias positions, an unexpected overlapping occurs between the channel response and the alias of the Rx sequence due to the channel delay spreading and the propagation delay, so that the confusion between the target position and the alias position may occur among different CS-applying sequences.

Therefore, if a specific system decides a CS-applying interval of the CAZAC sequence, the CS-applying interval may be decided in a specific interval having no overlapping in location between the channel response and the alias of the Rx sequence in consideration of the alias generated by the channel response.

By the above-mentioned description, it is assumed that the above-mentioned term "restricted cyclic shift (CS) condition" or "high-speed mode" indicates that a specific root index is unavailable and/or the number of cyclic shifts applicable to each root index is limited. Also, it is assumed that the random access UE under the restricted cyclic shift (CS) condition is contained in a cell or region having many high-mobility UEs.

However, if the above-mentioned scheme for limiting the number of available cyclic shifts (CSs) is discriminated according to the mobility of each UE (e.g., UE speed) instead of a specific cell unit or region unit, the random access UE under the restricted cyclic shift (CS) condition may be a high-mobility UE.

As described above, if the random access UE under the restricted cyclic shift (CS) condition is used, a specific root index may be used, and the number of cyclic shifts applicable to each root index may be changed to another number, such that the present invention is unable to indicate all information using the general sequence set of Table 1 and/or Table 2. Therefore, a general method for indicating all the information using the general sequence commands each UE to perform an additional signaling for the above-mentioned cyclic shift condition, such that there is needed to establish the sequence type condition capable of being used by each UE using the above-mentioned additional signaling, resulting in the occurrence of overhead.

In this case, although the restricted cyclic shift (CS) is used, the present invention can re-analyze the sequence-set combination acquired when the UE uses a general cyclic shift, and can allow the UE to acquire sequence type information using the additional sequence set without using the additional signaling overhead.

For the convenience of description, the above-mentioned first method which reanalyzes the sequence set information generated under the general cyclic shift condition in order to acquire sequence type information will hereinafter be referred to as a first embodiment. The above-mentioned second method which acquires the sequence type information using a new sequence set under the restricted cyclic shift (CS) condition will hereinafter be referred to as a second embodiment. In more detail, compared with the conventional art, the first embodiment relates to a method for acquiring UE-sequence type information when a sequence set has been configured under the general cyclic shift condition, and the second embodiment relates to a method for acquiring UE-sequence type information when a new sequence set has been configured under the restricted cyclic shift (CS) condition.

First Embodiment

The first embodiment provides a method for reanalyzing the sequence set information generated under the general cyclic shift condition, and acquire sequence type information.

Figure 3:
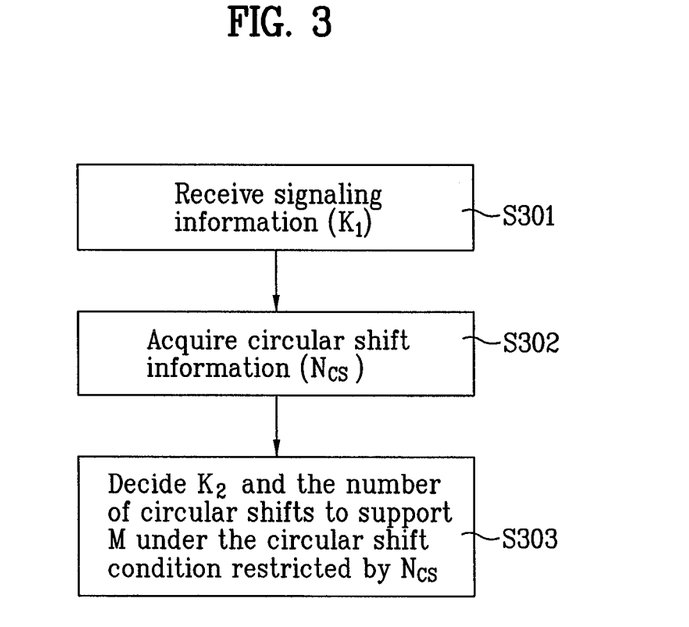
FIG. 3 is a flow chart illustrating a method for allowing a user equipment (UE) performing a random access under a restricted CS condition to acquire available sequence type information according to a first embodiment of the present invention.

FIG. 3 is a flow chart illustrating a method for allowing a user equipment (UE) performing a random access under a restricted CS condition to acquire available sequence type information according to a first embodiment of the present invention.

Referring to FIG. 3, the random access UE under the restricted cyclic shift (CS) receives the signaling information associated with available sequence type information at step S301. In this first embodiment, the received signaling information is indicative of the signaling based on the sequence set of the general cyclic shift condition. For the convenience of description and better understanding of the present invention, it is assumed that there is no difference in signaling between the general cyclic shift condition and the restricted cyclic shift condition.

However, the first embodiment does not recognize the number ($K_1$) of root indexes analyzed by the signaling information received from the base station as the number of available root indexes. In other words, according to the combination of the received signaling information, the number ($K_1$) of root indexes is not determined to be the number of available root indexes, and is used as only the parameter for calculating the number of available cyclic shifts under the restricted cyclic shift condition. In this way, the number of cyclic shifts for each root index according to the signaling information received from the base station (BS) are not determined to be the number of available cyclic shifts.

In more detail, the user equipment (UE) receives the signaling information at step S301, and calculates a cyclic shift value ($N_{cs}$) using the root index information ($K_1$) according to the received signaling information at step S302. For this purpose, it is preferable that the user equipment (UE) may pre-recognize the length (N) of a used sequence and the number (M) of random access opportunities. According to the above-mentioned 3GPP LTE system, the sequence length N is preset to 839 samples, and the number of random access opportunities which must be supported by each cell is preset to 64.

In this way, the user equipment (UE) decides the cyclic shift value using the signaling information received from the base station (BS), and can decide the number ($K_2$) of actual root indexes capable of supporting the M number of random access opportunities under the restricted cyclic shift condition using the decided cyclic shift value. In more detail, if the present invention is unable to use a specific root index under a given restricted cyclic shift condition, the corresponding root index is not considered. If the number of cyclic shifts applicable to each root index is limited due to the aliasing caused by the frequency offset, the present invention can acquire the sequence configuration information capable of supporting M number of random access opportunities.

For example, if the present invention is unable to use some cyclic shifts after deciding the number of available cyclic shifts on the basis of the cyclic shift value ($N_{cs}$) of the above step S302, the present invention may select the number ($K_2$)

of root indexes capable of supporting a given random access opportunity using the number of available cyclic shifts other than unavailable cyclic shifts.

In the above-mentioned process, if the present invention is unable to support the M number of random access opportunities using a specific number ($K_2$) of root indexes, the number (K2) of root indexes can be changed to another number. In this way, a variety of methods for changing the number ($K_2$) of root indexes may be used, for example, a method for increasing the number of root indexes by a predetermined natural number, a method for deciding an increment using other information such as a cell ID or sector ID, and a method for directly signaling the increment. In this way, if the number of root indexes is changed to another root index number, the present invention can generate the cyclic shift sequence under the cyclic shift condition according to the changed root index number. The above-mentioned first embodiment may repeat the above-mentioned process until the number of random access opportunities which must be supported by each cell.

As described above, the above-mentioned first embodiment reanalyzes the signaling information received from the base station (BS) using the same signaling information as in the general cyclic shift condition, without using the additional signaling overhead, such that it can effectively acquire available sequence type information.

In association with the above-mentioned description of FIG. 3, the received signaling information is the number ($K_1$) of root indexes from among random access parameters, and other parameter information (i.e., $N_{cs}$) and the number ($K_2$) of limitation-mode root indexes is decided. However, the received signaling information may be another parameter (e.g., $N_{cs}$) from among the random access parameters, instead of the root index value. In other words, the present invention analyzes the received parameter (Ncs) in different ways according to the restricted and unrestricted cyclic shift (CS) modes, such that the random access sequence can be selected.

Second Embodiment

The second embodiment provides a method for acquiring sequence type information using a new sequence set configured under the restricted cyclic shift condition.

For example, for the same sequence configuration, a parameter for the general cyclic shift and a parameter for the restricted cyclic shift may be defined differently. In this case, the UE may use different parameters according to individual cell modes (e.g., high-mobility mode and low-mobility mode).

In more detail, a specific UE receives the signaling information from the base station (BS), where the signaling information has a parameter that is different from the parameter that the signaling information under the general cyclic shift condition has. In other words, the base station (BS) uses a predetermined sequence set and performs the signaling on a combination the specific UE is to use from among combinations included in the predetermined sequence set, such that it can transmit available sequence type information to the specific UE. The sequence set being used in the second embodiment may be established separately from the sequence set under the general cyclic shift condition, or may be configured as a single sequence set including the sequence set under the general cyclic shift condition.

The above-mentioned sequence set based on the restricted cyclic shift condition can be configured in various ways, and a detailed description thereof will hereinafter be described.

For one example, a method for constructing the sequence set according to this second embodiment may maximize the number of cyclic shift sequences under the restricted cyclic shift condition. This maximization can be implemented in various ways. For example, a specific cyclic shift value having many more restricted cyclic shifts available for each root index may be selected. This selection can reduce the complexity of BS (Base Station) or UE. In this way, an additional combination may be configured for the high-mobility cell by the selected combination, such that the resultant sequence set may be configured. Also, this selected combination is extended to the low-mobility cell or the medium-mobility cell, such that a single sequence set may be configured.

For another example, the second embodiment considers the Rx-signal aliasing caused by the frequency offset to determine a variable cyclic shift value, and may generate the sequence set using the variable cyclic shift value.

In other words, if the Rx signal is detected, the aliasing may occur due to the frequency offset as shown in FIG. 2, and the present invention does not exclude unavailable cyclic shift sequences from among several sequences of the fixed CS sizes caused by the above aliasing, and arranges the CS-applying interval outside of a no-distinction interval caused by the aliasing, such that it can generate many more restricted cyclic shift sequences in a specific root index.

Figure 4:
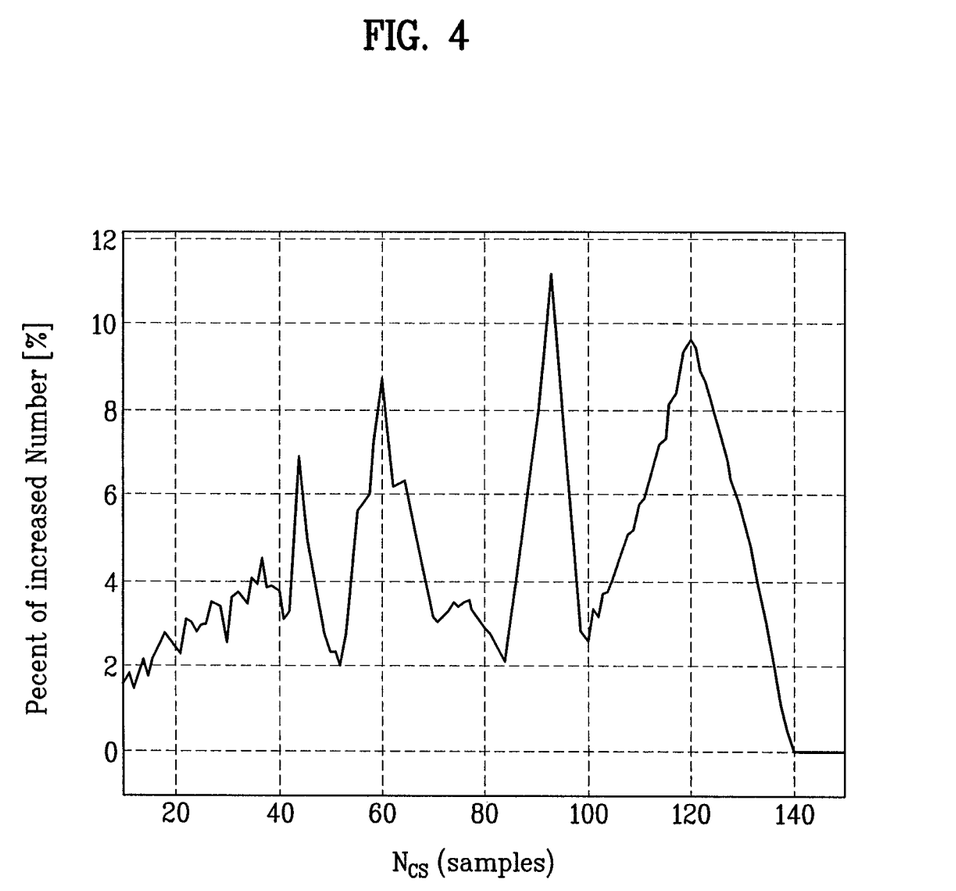
FIG. 4 is a graph illustrating the ratio of the number of first CS sequences acquired when a sequence set based on a variable CS interval is configured to the number of second CS sequences acquired when a sequence set based on a fixed CS interval is configured.

FIG. 4 is a graph illustrating the ratio of the number of first CS sequences acquired when a sequence set based on a variable CS interval is configured to the number of second CS sequences acquired when a sequence set based on a fixed CS interval is configured.

Referring to FIG. 4, a horizontal axis is a cyclic shift value (i.e., the number of samples). A vertical axis indicates that the number of cyclic shift sequences under a variable cyclic shift interval is higher than that of the fixed cyclic shift interval. For the convenience of description, it is assumed that the sequence length is 839 samples.

As another method for constructing the sequence set, the present invention provides a method for generating the restricted cyclic shift sequence set using the fixed CS-applying interval, and there is the lowest difference between the restricted cyclic shift sequence set and the variable CS-applying interval example based on the aliasing. In this way, if the cyclic shift interval is variably determined, the number of available cyclic shift sequences under the restricted cyclic shift condition can be increased. However, if the CS-applying interval is adjusted according to aliasing generation positions of individual sequences, the system complexity may unexpected increase. Therefore, the present invention uses the fixed CS-applying interval when the sequence set is configured, and acquires a cyclic shift value for minimizing the difference between the variable CS-applying interval case and the fixed CS-applying interval case using the result of FIG. 4, thereby providing a method for constructing the sequence set. In other words, this example selects a cyclic shift value having the smallest increment in the graph of FIG. 4, such that the sequence set is configured, It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention allows the UE of a restricted CS region to easily acquire available sequence type information without using additional signaling overhead.

Although the sequence type information acquisition method and the sequence set construction method have been disclosed on the basis of the 3GPP LTE system, the present invention is able to use all the CS-applying sequence. Although the frequency offset problem occurs, the present invention can be applied to all kinds of communication systems capable of limiting the above cyclic shift.

The invention claimed is:

1. A method for user equipment (UE) to transmit a random access channel (RACH) preamble sequence to a base station (BS), the method comprising:
   receiving, from the BS, signaling information for a random access to the BS; and
   transmitting, to the BS, the RACH preamble sequence generated based on the signaling information,
   wherein the signaling information is associated with a first parameter value for an unrestricted cyclic shift set and a second parameter value for a restricted cyclic shift set, and
   wherein the RACH preamble sequence is generated using the first parameter value when the UE is in a low-mobility mode and the RACH preamble sequence is generated using the second parameter value when the UE is in a high-mobility mode.

2. The method according to claim 1, wherein the signaling information has a length of 4 bits.

3. The method according to claim 1, wherein the first parameter value is a first cyclic shift value and the second parameter value is a second cyclic shift value different from the first cyclic shift value.

4. A method for a base station (BS) to receive a random access channel (RACH) preamble sequence from user equipment (UE), the method comprising:
   transmitting, to the UE, signaling information for a random access to the BS; and
   receiving, from the UE, the RACH preamble sequence generated based on the signaling information,
   wherein the signaling information is associated with a first parameter value for an unrestricted cyclic shift set and a second parameter value for a restricted cyclic shift set, and
   wherein the RACH preamble sequence is generated using the first parameter value when the UE is in a low-mobility mode and the RACH preamble sequence is generated using the second parameter value when the UE is in a high-mobility mode.

5. The method according to claim 4, wherein the signaling information has a length of 4 bits.

6. The method according to claim 4, wherein the first parameter value is a first cyclic shift value and the second parameter value is a second cyclic shift value different from the first cyclic shift value.

7. User equipment (UE) for transmitting a random access channel (RACH) preamble sequence to a base station (BS), the UE comprising:
   a receiver configured to receive, from the BS, signaling information for a random access to the BS; and
   a transmitter configured to transmit, to the BS, the RACH preamble sequence generated based on the signaling information,
   wherein the signaling information is associated with a first parameter value for an unrestricted cyclic shift set and a second parameter value for a restricted cyclic shift set, and
   wherein the RACH preamble sequence is generated using the first parameter value when the UE is in a low-mobility mode and the RACH preamble sequence is generated using the second parameter value when the UE is in a high-mobility mode.

8. The UE according to claim 7, wherein the signaling information has a length of 4 bits.

9. The UE according to claim 7, wherein the first parameter value is a first cyclic shift value and the second parameter value is a second cyclic shift value different from the first cyclic shift value.

10. A base station (BS) for receiving a random access channel (RACH) preamble sequence from a user equipment (UE), the base station comprising:
    a transmitter configured to transmit, to the UE, signaling information for a random access to the BS; and
    a receiver configured to receive, from the UE, the RACH preamble sequence generated based on the signaling information,
    wherein the signaling information is associated with a first parameter value for an unrestricted cyclic shift set and a second parameter value for a restricted cyclic shift set, and
    wherein the RACH preamble sequence is generated using the first parameter value when the UE is in a low-mobility mode and the RACH preamble sequence is generated using the second parameter value when the UE is in a high-mobility mode.

11. The base station according to claim 10, wherein the signaling information has a length of 4 bits.

12. The base station according to claim 10, wherein the first parameter value is a first cyclic shift value and the second parameter value is a second cyclic shift value different from the first cyclic shift value.

* * * * *